Figure 1:
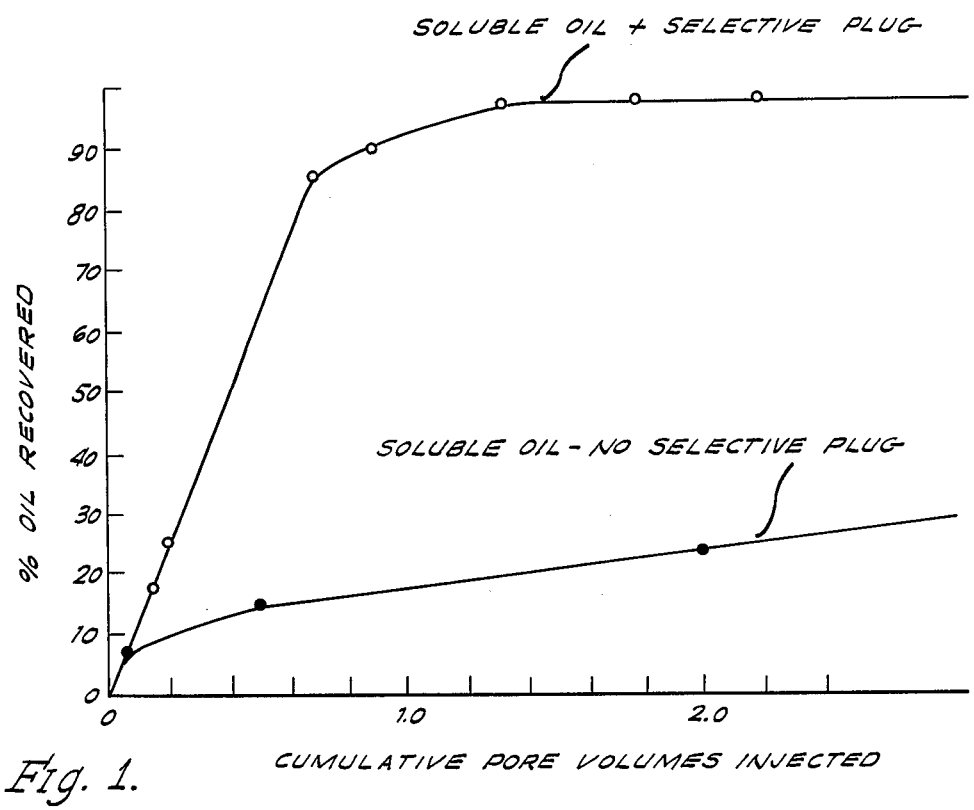

United States Patent [19]
Bernard

[11] 3,882,938
[45] May 13, 1975

[54] PROCESS FOR RECOVERING OIL FROM HETEROGENEOUS RESERVOIRS

[75] Inventor: George G. Bernard, La Mirada, Calif.

[73] Assignee: Union Oil Company of California, Brea, Calif.

[22] Filed: July 17, 1972

[21] Appl. No.: 272,558

[52] U.S. Cl. .................. 166/270; 166/273; 166/292
[51] Int. Cl. ...................... E21b 43/22; E21b 43/27
[58] Field of Search ................ 166/270, 292–295, 166/273

[56] References Cited
UNITED STATES PATENTS

| | | | |
|---|---|---|---|
| 3,127,934 | 4/1964 | Csaszar | 166/270 |
| 3,244,230 | 4/1966 | Sharp | 166/292 |
| 3,261,400 | 6/1966 | Elfrink | 166/292 |
| 3,285,338 | 11/1966 | Boston | 166/270 |
| 3,307,629 | 3/1967 | Sharp | 166/294 |
| 3,308,884 | 3/1967 | Robichaux | 166/295 |
| 3,324,944 | 6/1967 | Doettmann | 166/273 |
| 3,404,734 | 10/1968 | Levine et al. | 166/294 |
| 3,443,636 | 5/1969 | Gogarty | 166/270 |
| 3,476,184 | 11/1969 | Davis | 166/273 |
| 3,530,937 | 9/1970 | Bernard | 166/270 |
| 3,565,176 | 2/1971 | Wittenwyler | 166/270 |
| 3,656,550 | 4/1972 | Smith et al. | 166/270 |
| 3,667,545 | 6/1972 | Knight | 166/273 |
| 3,684,011 | 8/1972 | Presley et al. | 166/270 |
| 3,718,187 | 2/1973 | Milton | 166/295 |
| 3,741,307 | 6/1973 | Sandford et al. | 166/273 |

*Primary Examiner*—Stephen J. Novosad
*Assistant Examiner*—Jack E. Ebel
*Attorney, Agent, or Firm*—Dean Sandford; Richard C. Hartman; Lannas S. Henderson

[57] ABSTRACT

A process for recovering oil from heterogeneous subterranean reservoirs having strata of widely varying permeabilities in which a soluble oil miscible with the connate reservoir oil and with water is injected into the reservoir through an injection well and wherein one or more aqueous solutions of reagents that react in the reservoir to form a plugging material are injected into the reservoir through the injection well prior to completing the injection of the soluble oil, and thereafter an aqueous flooding medium is injected to drive the soluble oil towards a spaced production well from which fluids are recovered.

9 Claims, 2 Drawing Figures

PROCESS FOR RECOVERING OIL FROM HETEROGENEOUS RESERVOIRS

This invention relates to the recovery of oil from subterranean petroleum reservoirs, and more particularly to an improved soluble oil flooding process for the recovery of oil from heterogenous oil-bearing reservoirs.

It has long been recognized that substantial amounts of oil remain unrecovered at the completion of normal primary recovery operations. Hence, various secondary and tertiary methods of recovering additional quantities of oil have been developed, such as the well-known technique of water flooding in which water is injected into the reservoir through an injection well to drive additional oil toward one or more production wells spaced apart in the reservoir from the injection well. Although an additional quantity of oil can often be recovered by water flooding, the efficiency of the water flood and the ultimate oil recovery can be further improved by introducing a solvent that is miscible with the connate oil, or with both the connate oil and the flood water, into the reservoir ahead of the flood water.

Various soluble oils and water-in-oil microemulsions are particularly efficient solvent systems for the miscible displacement of oil from oil-containing petroleum reservoirs, both in secondary and tertiary recovery operations. However, because of the relatively high cost of these solvents, it is usually preferred that only a relatively small amount of the solvent or miscible agent be injected, followed by the injection of a substantially larger quantity of aqueous flooding medium to drive the solvent through the reservoir toward the production wells.

Heterogeneity in the reservoir structure often results in an injected fluid not being uniformly distributed throughout that portion of the reservoir being treated. While, in water flooding, it is desirable that high volumetric sweep efficiencies be achieved to prevent the flood water from bypassing areas of the reservoir and leaving unrecovered oil in these bypassed areas; because of the large volume of flood water injected in the typical water flood, the success of the operation is not completely jeopardized by reservoir heterogeneity, unless highly permeable streaks are encountered that cause channelling of the flood water from the injection wells directly to the producing wells. Also, even where permeable channels are encountered, channelling of the flood water can be controlled by treating the more permeable zones with oil-soluble, wter-insoluble diverting agents.

However, in the miscible flooding processes wherein the reservoir is treated with a small amount of a solvent that is driven through the reservoir by a subsequently injected aqueous displacement fluid, uniform contacting of the reservoir by the solvent is essential, and minor reservoir heterogeneity can cause a major reduction in oil recovery. Because of the relatively small amount of solvent usually employed in these processes, and because the solvent is disposed at the front of the drive bank, it is essential that this initial portion of the bank be uniformly brought into contact with as much of the oil-bearing portion of the reservoir as possible, and precluded from entering water-bearing strata and other zones contacting little oil. Uniform distribution of the miscible fluid at the initial oil-miscible fluid interface is especially critical in watered-out reservoirs containing only residual oil, since oil will be recovered from only that portion of the reservoir contacted by the soluble oil, as the subsequently injected flood water alone will effect no further recovery of oil.

Accordingly, a principal object of this invention is to provide an improved soluble oil flooding process for the recovery of petroleum from subterranean reservoirs.

Another object of the invention is to provide a miscible flooding process in which a heterogeneous reservoir is substantially uniformly contacted with a soluble oil.

A further object of this invention is to provide a method of increasing the volumetric sweep efficiency of a small amount of a soluble oil injected ahead of an aqueous drive fluid.

A still further object of this invention is to effect substantially uniform distribution of a small volume of soluble oil injected into a heterogeneous reservoir ahead of a water drive.

Other objects and advantages of the invention will be apparent from the following description.

Briefly, this invention contemplates a process for recovering oil from heterogeneous subterranean reservoirs having strata of widely varying permeabilities in which a soluble oil miscible with both the connate reservoir oil and with water is injected into the reservoir through an injection well and wherein one or more aqueous solutions of reagents that react in the reservoir to form a plugging material are injected into the reservoir through the injection well prior to completing the injection of the soluble oil, and thereafter an aqueous flooding medium is injected to drive the soluble oil towards a spaced production well from which fluids are recovered. The aqueous solution or solutions of reagents that react in the reservoir to form plugging materials can be injected into the reservoir prior to injection of the soluble oil, or these reagent solutions can be staged with the soluble oil wherein a portion of the soluble oil is injected, followed by the injection of the aqueous reagent solutions, then by a second portion of the soluble oil.

While the soluble oil flooding process of this invention is particularly adapted for the recovery of oil from heterogeneous reservoirs; as a practical matter, most petroleum reservoirs exhibit some heterogeneity, and thus oil recoveries are improved in most naturally occurring petroleum reservoirs by treatment with the process of this invention. bh hetrogeneity, it is meant that the reservoir is comprised of stratified layers of varying permeability, or that it contains fractures, cracks, fissures, streaks, vuggs, or zones of varying permeability that cause injected fluids to advance through the reservoir nonuniformly. Thus, the formations that are particularly amenable to treatment by the process of this invention are those formations that have strata or zones of different permeabilities, such as strata having permeabilities varying by 50 millidarcies or more, or which otherwise are structurally faulted so that the injected soluble oil does not advance through the formation at a substantially uniform rate along the entire flood front, but instead, streaks or fingers through these more permeable zones. Volumetric sweep efficiency is improved and oil recoveries increased as the miscible flood front is rendered more uniform. The term "volumetric sweep efficiency" as used herein is defined as the product of the horizontal and vertical sweep efficiencies.

In treating those reservoirs having highly permeable streaks or channels which contain negligible or only a relatively small proportion of the total oil present in the reservoir, it is preferred to inject the aqueous solution of reactive plugging agent prior to injecting the soluble oil. The plugging agent solution preferentially enters the more permeable streak or channel whereupon it reacts to form a plugging material therein, whereby the subsequently injected soluble oil is diverted to the less permeable zones of the reservoir. However, in reservoirs having strata of varying permeability wherein a substantial proportion of the oil is present in the higher permeability zones, it is preferred that a first portion of the soluble oil be injected into the reservoir, followed by the injection of the aqueous plugging agent solution or solutions, then by a second portion of the soluble oil. In this manner, the first portion of the soluble oil preferentially enters the more permeable strata to mobilize and displace the oil therein, followed by the aqueous plugging agent solution or solutions which react to form a plugging material therein. The subsequently injected second portion of the soluble oil is diverted to the less permeable strata of the reservoir wherein it is then effective in mobilizing and displacing oil from these zones. In this latter embodiment of the invention, a plurality of successive slugs of soluble oil and aqueous plugging agent solution can be alternately injected to treat different strata.

Figure 2:
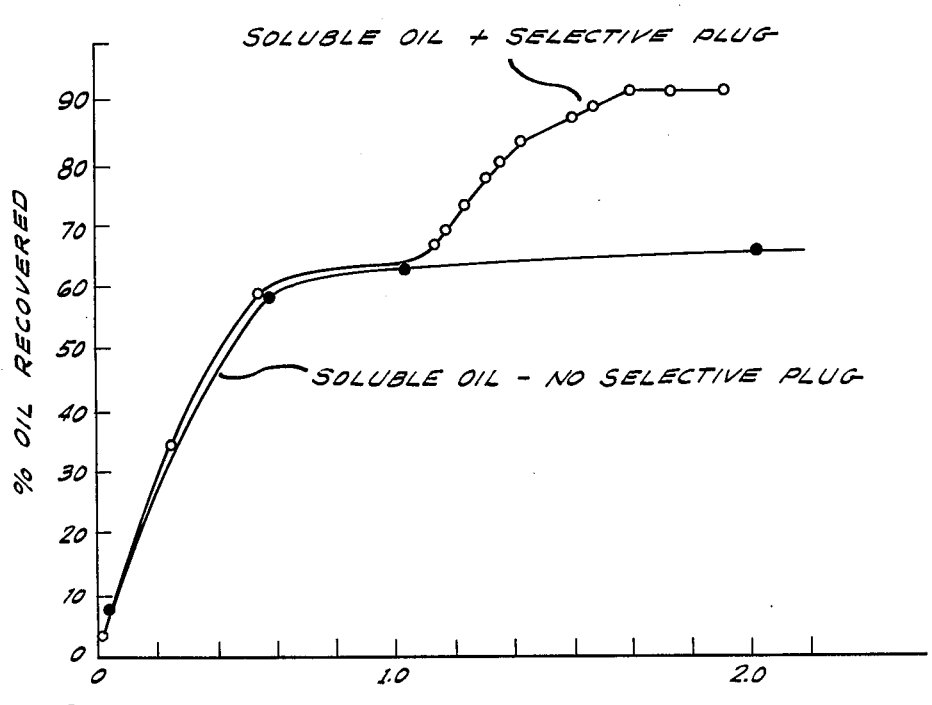

The invention is further illustrated by reference to the accompanying drawing in which:

FIG. 1 graphically illustrates the increased oil recovery obtainable from a reservoir having a high permeability channel containing only a minor proportion of the oil, as determined in Example 1; and FIG. 2 graphically illustrates the increased oil recovery obtainable from a reservoir having high permeability strata containing a substantial proportion of the oil, as determined in Example 2.

More specifically, this invention involves a soluble oil flooding process for recovering oil from heterogenous reservoirs in which the soluble oil is diverted to the less permeable strata of the reservoir by selectively plugging the more permeable strata. In the practice of this invention, a slug of soluble oil in the form of a substantially anhydrous liquid or a water-in-oil microemulsion is injected into the reservoir through one or more injection or input wells penetrating the oil-bearing formation and forced through the reservoir by subsequently injected flood water toward at least one production or output well similarly completed in the reservoir. As the flooding medium passes through the reservoir, it displaces oil from the strata that it contacts and moves it to the producing well whereupon the oil can be recovered by conventional means. One or more aqueous solutions of reagents that react in the reservoir to form a plugging material are injected through the injection well and into the reservoir prior to completing the injection of the soluble oil. The amount of reactive plugging agent injected need not be sufficient to provide complete shutoff of the more permeable strata, but need be only sufficient to adjust the permeability of these zones sufficiently to obtain more uniform permeability and more uniform distribution of the subsequently injected flooding media. The injection and production wells can be arranged in any convenient pattern designed to achieve maximum contact of the oil-bearing zones by the advancing flood front; such as the conventional "five-spot" pattern wherein a central producing well is surrounded by four somewhat symmetrically located injection wells. Another of the conventional flooding patterns that can be employed in the practice of this invention is the "line drive" pattern in which the injection wells are arranged in a line so that the injected flooding medium advances through the formation to displace oil toward one or more spaced production wells that can also be arranged in a line substantially parallel to the line of injection wells.

The soluble oils used herein are oleaginous compositions which have the ability to spontaneously emulsify with water when admixed therewith. These soluble oils comprise a liquid hydrocarbon, a preferentially oil-soluble surface active organic sulfonate, an optional preferentially water-soluble surface active organic sulfonate, and a stabilizing agent. The emulsions formed by the addition of water to a soluble oil are of the water-in-oil type in that, at water concentrations less than the inversion concentration, oil is the continuous phase and the water is dispersed in the oil in the form of very fine droplets, or micelles, which are less than about 0.1 micron in size, and usually range in size from about 100 to 600 A. These emulsions are generally transparent in appearance, and are stable in that they remain as microemulsions on aging. By transparent, it is meant that the microemulsions do not have a cloudy or opaque appearance, even though they may contain color bodies. It is recognized, of course, that some cloudiness may appear at certain water concentrations without adversely effecting the utility of the microemulsion as a displacement agent. Emulsions of this type are designated microemulsions to distinguish them from ordinary water-in-oil macroemulsions in which the lower limit of the size of the water droplets is about 0.1 micron. At water concentrations above the inversion concentration, the emulsion inverts to an oil-in-water emulsion in which droplets of oil are dispersed in a continuous water phase. It is preferred that the water concentrations of the soluble oils of this invention be maintained below the inversion concentration so as to prevent inversion to emulsions of the oil-in-water type.

One of the major constituents of the soluble oil composition is a liquid hydrocarbon, which can comprise crude petroleum, such as a crude oil previously recovered from the reservoir, or other conveniently available crude oil; or a petroleum fraction such as a refined or semi-refined petroleum product, such as gasoline, naphtha, stove oil, diesel and gas oil; a residual product obtained by the distillation of lower boiling fractions from a crude oil, such as a bunker fuel oil and other residual products; a low value refinery by-product, such as catalytic cycle oil, lube oil extract, and the like; and liquefied normally gaseous hydrocarbons, such as propane, butane and LPG. While soluble oils can be prepared from any of these hydrocarbons, or mixtures of different hydrocarbons, in many miscible flooding operations it is preferred to use a soluble oil compounded with petroleum crude oil, such as crude oil previously recovered from the reservoir, or with other conveniently available crude oil.

The preferentially oil-soluble surfactant material is an oil-soluble, relatively water-insoluble surface active organic sulfonate that exhibits substantially greater solubility in oil than in water. Some of the preferentially oil-soluble organic sulfonates useful in the practice of this invention are almost completely insoluble in water, while others exhibit limited water solubility, particularly at elevated temperatures. Even though the preferentially oil-soluble organic sulfonates may exhibit some water solubility, they are nevertheless characterized by markedly greater solubility in oil. The preferentially water-soluble surfactant material is a water-soluble, relatively oil-insoluble surface active organic sulfonate that exhibits substantially greater solubility in water than in oil. Some of the these preferentially water-soluble organic sulfonates are almost completely insoluble in oil, while others exhibit limited oil solubility, particularly at elevated temperatures. Even though the preferentially water-soluble organic sulfonates may exhibit some oil solubility, they are nevertheless characterized by markedly greater solubility in water.

One class of preferentially oil-soluble organic sulfonates particularly useful in the practice of this invention are oil-soluble alkyl aryl sulfonates that contain only one sulfonic group attached to an alkyl aryl hydrocarbon. The preferentially oil-soluble alkyl aryl sulfonates are those which in the form of their sodium salts have average molecular weights of more than about 400. Among the preferred preferentially oil-soluble organic sulfonates are alkyl sodium benzene sulfonates and alkyl sodium polyaryl sulfonates having molecular weights of more than about 400. The preferred preferentially water-soluble organic sulfonates include water-soluble alkyl aryl sulfonates. The water-soluble alkyl aryl sulfonates are generally those which in the form of their sodium salts have average molecular weights of less than about 400 or which contain more than one sulfonic acid group per molecule, i.e., the preferred water-soluble sulfonates are monosulfonates or polysulfonates which in the form of their sodium salts have average equivalent weights of less than about 400. It has been found that in soluble oils compounded from petroleum crude oil or other high boiling hydrocarbons, superior results are obtained by employing as the preferentially oil-soluble organic sulfonate an alkyl aryl sulfonate which in the form of its sodium salt has an average molecular weight above about 450, and preferably in the range of about 450 to 550.

The soluble oil compositions are prepared by admixing into the hydrocarbon a preferentially oil-soluble organic sulfonate, such as an alkyl aryl sulfonate or mixture of sulfonates which in the form of their sodium salts have average molecular weights of more than about 400, and optionally a preferentially water-soluble organic sulfonate, such as an alkyl aryl monosulfonate or mixture of monosulfonates which in the form of their sodium salts have molecular weights of less than about 400 or such as polysulfonates having average equivalent weights of less than about 400. Alternatively, a mixture of preferentially water-soluble and preferentially oil-soluble sulfonates can be employed, such as a mixture of alkyl aryl sulfonates which in the form of the sodium salt have an average molecular weight in the range of about 400 to 500 and which includes both preferentially oil-soluble and preferentially water-soluble sulfonates.

The preferentially oil-soluble alkyl aryl sulfonates and preferentially water-soluble alkyl aryl sulfonates useful in the practice of this invention can be prepared by sulfonating an appropriate alkyl aryl hydrocarbon or mixture of hydrocarbons. Thus, a preferred preferentially oil-soluble alkyl aryl sulfonate can be prepared by sulfonating an alkyl aryl hydrocarbon to yield an alkyl aryl sulfonate which in the form of its sodium salt has a molecular weight of more than about 400. The preferred preferentially water-soluble alkyl aryl sulfonates are prepared by selecting the alkyl aryl hydrocarbon so that when sulfonated, the resulting alkyl aryl sulfonate in the form of its sodium salt has a molecular weight of less than about 400, or by sulfonating sufficiently to form poylsulfonates. These sulfonates are preferably in the form of the sodium salt, however, other salts can be used.

A readily available source of alkyl aryl sufonates is the natural petroleum sulfonates produced by sulfonating a relatively narrow boiling range mixture of petroleum hydrocarbons. Depending upon the boiling range of the hydrocarbon fraction, on sulfonation, mixtures of alkyl aryl monosulfonates are produced which may be either preferentially water-soluble or preferentially oil-soluble. The term "natural petroleum sulfonates" is a commercial designation of petroleum sulfonates which are obtained by a treatment of petroleum fractions, particularly solvent treated aromatic fractions, with sulfuric acid, fuming sulfuric acid or sulfur trioxide. Upon sulfonation, two types of general products are formed which are designated mahogany acid sulfonates and green acid sulfonates. The terminology is based on the colors imparted to the sulfonates in solution, a brownish color being imparted to the sulfonates which remain in the oil and the greenish color imparted to aqueous solutions made from the acid sludges formed in the sulfonation process. The mahogany sulfonated are preferentially oil-soluble and the green sulfonates are preferentially water-soluble.

The mahogany sulfonates are alkyl aryl sulfonates which usually contain only one suflonic group per molecule and both the green and the mahogany types contain mixtures of sulfonates of varying molecular weights with the mahogany, or oil-soluble sulfonates generally containing the sulfonates of higher molecular weights. The green sulfonates, or water-soluble sulfonates, contain the sulfonates of lower molecular weight of those containing more than one sulfonate group per molecule.

The preferentially oil-soluble surface active material and the preferentially water-soluble surface active material are employed in the proportions of about 1 part of preferentially oil-soluble agent per part of water-soluble agent to about 15 parts of oil-soluble agent per part of water soluble agent, or more preferably to about 12 parts of oil-soluble agent per part of water-soluble agent. That is, the soluble oil compositions of this invention contain between about 1 to 15, or 1 to 12 parts of preferentially oil-soluble sulfonate per part of preferentially water-soluble suflonate. Although the optimum surfactant combination is dependent upon the characteristics of the particular reservoir, in many operations it is found that superior results are obtained with a surfactant combination containing about 1 to 4 parts of preferentially oil-soluble surface active material per part of preferentially water-soluble surface active material; and more particularly, with a surfactant mixture containing about 2 parts of preferentially oil-soluble agent per part of preferentially water-soluble agent.

The various stabilizing agents that are admixed with the soluble oil to improve the properties and stability of the resulting microemulsions formed by admixing the soluble oil with water include partially oxygenated hydrocarbons such as monohydric and polyhydric alcohols, ketones, ethers, and polyhydric alkyl ethers. More specifically, the stabilizing agents are monohydric aliphatic alchohols having three to five carbon atoms, dihydric aliphatic alcohols containing two to three carbon atoms, aliphatic ketones containing four to six carbon atoms, glycol ethers containing four to 10 carbon atoms, and dialkylene glycols containing four to six carbon atoms. Exemplary monohydric alcohols include propyl alcohol, isopropyl alcohol, n-butyl alcohol, isobutyl alcohol, secondary butyl alcohol, tertiary butyl alcohol, normal amyl alcohol and secondary amyl alcohol. Exemplary polyhydric aliphatic alochols include ethylene glycol, 1,3-propanediol and 1,2-propanediol. Exemplary aliphatic ketones include methyl ethyl ketone, diethyl ketone and methyl isobutyl ketone. Exemplary glycol ethers include ethylene glycol monoethyl ether (Cellosolve solvent), ethylene glycol monobutyl ether (butyl Cellosolve solvent), diethylene glycol monobutyl ether (butyl Carbitol solvent), diethylene glycol monoethyl ether (Carbitol solvent), diethylene glycol hexyl ether hexyl Carbitol solvent) and ethylene glycol hexyl ether (hexyl Cellosolve solvent). The terms "Cellosolve" and "Carbitol" are trademarks of the Union Carbide Corporation. Examplary dialkylene glycols include diethylene glycol and dipropylene glycol. Specific agents found particularly useful include isopropyl alcohol, secondary butyl alcohol, methyl ethyl ketone, ethylene glycol monoethyl ether, ethylene glycol monobutyl ether, diethylene glycol monobutyl ether, and diethylene glycol hexyl ether.

It has been found that increased quantities of oil can be recovered from a subterranean petroleum reservoir by a flooding process utilizing a soluble oil containing both preferentially oil-soluble and preferentially water-soluble surface active materials than can be recovered by either conventional water flooding or by miscible water flooding with the prior art soluble oils formulated with oil-soluble organic sulfonates, or other conventional surface active materials. Also, the soluble oil compositions of this invention do not exhibit the large increase in viscosity on taking up water that are characteristic of the prior art soluble oil compositions. For example, with the soluble oil compositions of this invention, the peak viscosity at the inversion water concentration may be not more than four to five times the viscosity of the anhydrous soluble oil. In contrast, the viscosity increase may be in excess of 50 to 100 fold with the prior art soluble oils. A further unexpected advantage observed with the soluble compositions of this invention is that the inversion of the microemulsion from a water-in-oil emulsion to an oil-in-water emulsion occurs at a higher water content than experienced with the prior art soluble oils. Thus, the soluble oils of this invention will take up more water prior to inversion than will the prior art soluble oils.

The soluble oils useful in the practice of this invention can be prepared by any of the conventional techniques. One suitable method is to prepare a substantially anhydrous soluble oil by admixing the hydrocarbon base stock, the stabilizing agent and the preferentially oil-soluble surface active material. Thereafter, the preferentially water-soluble surface active material is added. Water-in-oil microemulsions can be prepared by simply adding a desired amount of water to the substantially anhydrous soluble oil. Preferably, the water employed in forming the microemulsion is a salt-containing fresh water having a dissolved salt content of less than about 15,000 ppm, and more preferably less than about 5,000 ppm. Water-soluble salts of a monovalent metal can be added to obtain a water having a desired salt content.

The soluble oil composition comprises a mixture of about 45 to 90 volume percent liquid hydrocarbon, such as crude petroleum; 0.5 to 8 volume percent stabilizing agent, such as one of the above-described partially oxygenated organic liquids, or a mixture of these liquids, and 4 to 30 volume percent combined surface active materials containing both preferentially oil-soluble and preferentially water-soluble organic sulfonates in the previously disclosed proprotions. This composition can also contain water present as a water-in-oil microemulsion in an amount up to that amount causing inversion to an oil-in-water emulsion. The soluble oil composition useful in the process of the invention can also comprise 45 to 75 volume percent liquid hydrocarbon, 3 to 8 volume percent stabilizing agent, 8 to 30 volume percent combined surface active materials containing both preferentially oil and water-soluble organic sulfonate surface active materials in the previously disclosed proportions, and 0 to 40 percent water. Also, where the liquid hydrocarbon has a relatively high viscosity, an additional quantity of low viscosity, light liquid hydrocarbon can be added to increase the mobility of the resulting soluble oil to obtain a more favorable mobility ratio between the soluble oil and the following drive fluid. The light hydrocarbon will usually not constitute more than 25 percent by volume of the resulting soluble oil.

Any of a wide variety of known selective plugging agents can be employed in the plugging step of this invention. These agents are injected in liquid form, i.e., the plugging agent is a liquid, or is dissolved or dispersed in water, so that when pumped into the well it will preferentially enter into the more permeable strata open to the well whereupon it reacts to form a plugging material. Useful selective plugging agents include chemical agents that react with the reservoir rock, or with connate reservoir or injected fluids to form a precipitate or plugging deposit in the reservoir, exemplary of which are alkali metal hydroxides, sodium silicate, and the like; two or more reactive chemical agents injected successively, such as various water-soluble salts of polyvalent metals such as iron, aluminum, calcium, cobalt, nickel, copper, mercury, silver, lead, chromium, zinc, cadmium and magnesium which form a precipitate with separately injected aqueous solutions of sodium hydroxide, sodium carbonate, sodium borate, sodium bicarbonate, sodium silicate, sodium phosphate, or the potassium or ammonium salts of these anions; various polymeric materials that form substantially permanent plugging deposits in the reservoir, such as cross-linked polyacrylamide; and reactive agents wherein the gelation or precipitation is delayed until the agent is placed in the reservoir, such as hydraulic cements and delayed action silica gels. Also, various mixtures of these reactive plugging agents can be employed, such as admixtures of sodium silicate and polyacrylamide or cross-linked polyacrylamide, and admixtures of sodium silicates and hydraulic cement.

A preferred selective plugging agent is an aqueous solution of sodium silicate and a gelling agent such as an acid or an acid-forming compound, a water-soluble ammonium salt, a lower aldehyde, a polyvalent metal salt, or an alkali metal aluminate. Examplary gelling agents are sulfonic acid, hydrochloric acid, ammonium sulfate, formaldehyde, calcium chloride, aluminum sulfate and sodium aluminate. The sodium silicate reacts in the presence of the gelling agent to form a silica or silica alumina gel, or to precipitate the silicate as insoluble silicate. It is well-known that the gelling of sodium silicate in the presence of certain gelling agents is delayed, i.e., gelling occurs at some time after the sodium silicate and gelling agent are admixed, and under some conditions gelling is delayed for up to 7 days. It is preferred that the conditions be selected in accordance with known techniques to delay gelling of the sodium silicate for a period sufficient for its injection into the reservoir immediately adjacent to the well, but yet not for a period that would unduly prevent continuance of the flooding operation. Thus, in most cases, it is preferred that the conditions be selected so that gelling is delayed for about one day, and is substantially completed within about 7 days.

The volume of plugging agent solution injected and the concentration of plugging agent in the plugging agent solution can vary over wide ranges depending upon the particular agent selected, the specific characteristics of the reservoir and the connate reservoir fluids, the magnitude and extent of the heterogeneity, and the degree of fluid shutoff desired. Where sodium silicate is employed as the plugging agent, the concentration of sodium silicate in the plugging solution can vary from about 1 to 30 weight percent, weaker plugs being formed at the lower concentration and treating costs increasing at the higher concentrations. Thus, it is preferred that the concentration of sodium silicate in the plugging solution injected into the formation be between about 3 and 15 weight percent, and preferably between about 3 and 10 weight percent. The ratio of silica to sodium oxide ($SiO_2/Na_2O$) in the silicate can also vary within limits from about 1.5/1 to about 4/1 by weight. Preferably, however, the ratio should be from about 3/1 to about 3.5/1, i.e., it is preferred that the sodium silicate solution contain 3 to 3.5 parts of weight of silica ($SiO_2$) per part of sodium oxide ($Na_2O$).

Thus, it is apparent that any of a wide variety of settable liquids can be employed as the selective plugging agent injected in the plugging step of the process of this invention, it being required only that they react in the reservoir to form solids or gels that substantially reduce the permeability of the more permeable strata of the formation to the subsequently injected flooding media.

In the practice of the method of this invention wherein the plugging step is conducted prior to injection of the soluble oil, there is first introduced into a heterogeneous or highly stratified reservoir a quantity of the aqueous solution of plugging agent sufficient to penetrate into the more permeable strata of the reservoir a substantial distance from the injection well. It is preferred that the aqueous solution penetrate into the more permeable strata a distance of at least 20 feet from the injection well, and more preferably a distance of about 50 feet, although it is recognized that in some cases sufficient plugging solution can be injected to pass through the formation to one or more spaced production wells, which can be located several hundred feet or more from the injection well.

Upon completion of the plugging step, the soluble oil is injected into the reservoir through one or more injection wells in an amount sufficient to establish in the reservoir a bank which can be displaced through the reservoir. Satisfactory oil recoveries can usually be obtained by the injection of 0.01 to 0.15 reservoir pore volume of soluble oil. Aqueous flooding medium is then injected to displace the soluble oil toward at least one production well spaced apart in the reservoir from the injection well, from which fluids are produced in conventional manner. The aqueous flooding medium can comprise water or brine, and can be made more viscous by the addition of a thickening agent such as sugar, dextran, carboxymethyl cellulose, amines, glycerine, guar gum and mixtures of these agents. Also, the aqueous flooding medium can be rendered more viscous by the addition of a small amount of a water-soluble polymer, such as polyacrylamide, and particularly a partially hydrolyzed polyacrylamide. In the preferred method of practicing this invention, thickening agent is added to only an initial portion of the flood water. Thus, in this preferred embodiment, 0.01 to 0.15 reservoir pore volume of soluble oil is injected into the reservoir and followed by 0.1 to 1.0 reservoir pore volume of thickened aqueous flooding medium. Thereafter, water or brine is injected to drive the previously injected fluids toward at least one spaced production well.

Where the plugging step is conducted subsequent to the injection of an initial portion of the soluble oil, it is preferred that about 0.01 to 0.08 reservoir pore volume of soluble oil be injected into the reservoir, and that the soluble oil injection be interrupted and the aqueous plugging agent solution be injected in the previously described manner. Thereafter, the final portion of the soluble oil is injected and the flood concluded by injecting the aqueous flooding medium. Also, a plurality of successive slugs of soluble oil and plugging agent solution can be alternately injected into the reservoir.

The amount of selective plugging agent required in any well treatment is best determined from a knowledge of the characteristics of the particular reservoir to be treated. However, in many applications, the desired treatment can be obtained by injecting about 5 to 100 barrels of plugging agent solution per vertical foot of interval to be treated.

The invention is further described by the following examples which are illustrative of specific modes of practicing the invention and are not intended as limiting the scope of the invention as defined by the appended claims.

EXAMPLE 1

This example illustrates the practice of the process of this invention in recovering oil from a heterogeneous reservoir having a highly permeable streak communicating the injection and recovery well and wherein a negligible or small amount of oil is contained in the permeable streak. This reservoir configuration is simulated by two sand packs, designated A and B, connected in parallel. Sand pack A consists of a Lucite tube having a diameter of ½ inch and a length of 21 inches packed with No. 10 Heart of Texas sand. Sand pack B is a 1 ½-inch diameter by 21-inch tube packed with Nevada 130 sand. Sand pack A has a pore volume of 30 cc and sand pack B has a pore volume of 220 cc. Both sand packs are saturated with brine, then flooded with Illinois crude oil to about 81 percent oil saturation.

The parallel connected sand packs are flooded by sequentially injecting 0.06 pore volume of soluble oil, 0.5 pore volume of aqueous polymer solution containing about 0.2 weight percent of a partially hydrolyzed polyacrylamide marketed by the Dow Chemical Company under the trademark Pusher 500, and flooding to completion with tap water containing about 700 ppm dissolved salts. The fluids displaced from the sand pack are collected and oil recoveries determined at various stages of the flood. These data are summarized in Table 1 and presented graphically by the lower curve in FIG. 1.

Another pair of substantially identical sand packs are prepared and saturated with Illinois crude oil. These parallel connected sand packs are flooded by sequentially injecting the following:

|  | Pore Volume |
|---|---|
| 50% Sodium silicate solution | 0.02 |
| Fresh water | 0.008 |
| 25% Calcium chloride solution | 0.02 |
| 50% Sodium silicate solution | 0.008 |
| Fresh water | 0.08 |
| Soluble oil | 0.06 |
| Aqueous polyacrylamide solution | 0.5 |
| Fresh water | To completion |

The soluble oil and polymer solution have the same composition as employed in the initial flood. The results of this flooding operation are summarized in Table 1 and graphically illustrated by the upper curve in FIG.1.

TABLE 1

| Cumulative Fluid Injected, Pore Volume | OIL RECOVERY, % OIP | |
|---|---|---|
|  | Without Plugging Treatment | With Plugging Treatment |
| 0.5 | 14 | 60 |
| 1.0 | 17.5 | 92 |
| 1.5 | 20 | 97.2 |
| 2.0 | 24.5 | 97.2 |

It is apparent from these tests that not only is oil recovery from the severely stratified system markedly increased by the flooding operation including the plugging treatment, but also more oil is recovered early in the life of the flood with this treatment.

EXAMPLE 2

This example illustrates the practice of the process of this invention in recovering oil from a heterogeneous reservoir wherein a substantial proportion of the oil is contained in the more permeable strata. This reservoir configuration is simulated by two spaced sand packs, designated C and D, connected in parallel. Both sand packs employ identical 1½-inch diameter by 21-inch Lucite tubes. Sand pack C is packed with Nevada 130 sand and has a permeability of 1,980 millidarcies and sand pack D is packed with Del Monte 30 sand and has a permeability of about 26 darcies. Thus, although the pore volumes of the sand packs are substantially the same, sand pack D is over 13 times more permeable than sand pack C. As in the previous example, both sand packs are saturated with brine, then with Illinois crude oil to an oil saturation of about 80 percent.

The parallel connected sand packs are flooded by sequentially injecting 0.06 pore volume of the soluble oil employed in Example 1, then 0.5 pore volume of aqueous polymer solution containing about 0.2 weight percent of Pusher 500 polyacrylamide, and flooding to completion with tap water containing about 700 ppm dissolved salts. The fluids displaced from the sand pack are collected and oil recoveries determined at various stages of the flood. These data are summarized in Table 2 and presented graphically by the lower curve in FIG. 2.

Another pair of substantially identical sand packs are prepared and saturated with Illinois crude oil. These parallel connected sand packs are flooded by sequentially injecting the following:

|  | Pore Volume |
|---|---|
| Soluble oil | 0.03 |
| Aqueous polyacrylamide solution | 0.25 |
| Fresh water to water breakthrough | 0.30 |
| 25% Sodium silicate solution | 0.023 |
| Fresh water | 0.023 |
| 12.5% Calcium chloride solution | 0.023 |
| Fresh water | 0.023 |
| 25% Sodium silicate solution | 0.023 |
| Fresh water | 0.023 |
| 25% Sodium silicate solution | 0.023 |
| Fresh water | 0.023 |
| 12.5% Calcium chloride solution | 0.023 |
| Fresh water | 0.023 |
| 25% Sodium silicate solution | 0.023 |
| Soluble oil | 0.03 |
| Aqueous polyacrylamide solution | 0.25 |
| Fresh water | To completion |

The soluble oil and polymer solution have the same composition as employed in the initial flood. The results of this flooding operation are summarized in Table 2 and illustrated graphically by the upper curve in FIG. 2.

TABLE 2

| Cumulative Fluid Injected, Pore Volume | OIL RECOVERY, % OIP | |
|---|---|---|
|  | Without Plugging Treatment | With Plugging Treatment |
| 0.5 | 5.3 | 55 |
| 1.0 | 61 | 62 |
| 1.5 | 62 | 85 |
| 2.0 | 63 | 91 |

It is apparent from these tests that substantially more oil is recovered by the soluble oil flood employing the plugging treatment.

Various embodiments and modifications of this invention have been described in the foregoing description and examples, and further modifications will be apparent to those skilled in the art. Such modifications are included within the scope of this invention as defined by the following claims.

Having now described the invention, I claim:

1. In the method of recovering petroleum from heterogeneous subterranean reservoirs having strata of widely varying permeabilities wherein a substantial proportion of the oil is in the more permeable strata and in which a soluble oil miscible with both the connate reservoir oil and with water is first injected into the reservoir through an injection well, and thereafter an aqueous flooding medium is injected to drive the soluble oil towards a spaced production well from which fluids are recovered, the improvement which comprises injecting through said injection well and into said reservoir a first portion of said soluble oil, next injecting one or more aqueous solutions of reagents that react together in the reservoir to form a plugging material that substantially reduces the permeability of the more permeable strata of the formation, and thereafter injecting a second portion of said soluble oil.

2. The method defined in claim 1 wherein a plurality of successive slugs of said soluble oil and said aqueous reagent solutions are alternately injected into the reservoir.

3. The method defined in claim 1 wherein one of said aqueous reagent solutions is an aqueous solution of a sodium silicate having a weight ratio of $SiO_2/Na_2O$ from about 1.5/1 to about 4/1.

4. The method defined in claim 3 wherein said aqueous sodium silicate solution contains a gelling agent selected from the group consiting of acid and acid-forming compounds, water-soluble ammonium salts, lower aldehydes, aluminum salts, and alkali metal aluminates.

5. The method defined in claim 3 wherein there is also separately injected into the reservoir immediately preceding or following said aqueous solution of sodium silicate an aqueous solution containing a water-soluble salt of a polyvalent metal.

6. A method for flooding a heterogeneous reservoir having oil-containing strata of widely varying permeabilities, which comprises:

injecting through an injection well and into said reservoir a first portion of a soluble oil miscible with the connate reservoir oil and with water;

thereafter injecting through said injection well one or more solutions of reagents that react together in the reservoir to form a plugging material that substantially reduces the permeability of the more permeable strata of the formation;

next injecting a second portion of said soluble oil;

next injecting about 0.1 to 1 pore volume of flood water thickened by the addition of a viscosity increasing agent;

thereafter injecting flood water to drive said previously injected fluids through said reservoir; and recovering oil from a production well spaced apart in the reservoir from said injection well.

7. The method defined in claim 6 wherein each portion of said soluble oil is injected into said reservoir in an amount equivalent to 0.01 to 0.08 pore volume.

8. The method defined in claim 6 wherein said aqueous reagent solution is an aqueous solution of sodium silicate having a weight ratio of $SiO_2/Na_2O$ from about 1.5/1 to about 4/1 and containing a gelling agent selected from the group consisting of acid and acid-forming compounds, water-soluble ammonium salts, lower aldehydes, aluminum salts, and alkali metal aluminates.

9. The method defined in claim 6 wherein one of said aqueous reagent solutions is an aqueous solution of sodium silicate having a weight ratio of $SiO_2/Na_2O$ from about 1.5/1 to about 4/1 and wherein there is also separately injected into the reservoir immediately preceding or following said aqueous sodium silicate solution an aqueous solution containing a water-soluble salt of a polyvalent metal.

* * * * *

UNITED STATES PATENT OFFICE
CERTIFICATE OF CORRECTION

PATENT NO. : 3,882,938
DATED : May 13, 1975
INVENTOR(S) : GEORGE G. BERNARD

It is certified that error appears in the above-identified patent and that said Letters Patent are hereby corrected as shown below:

In Column 13, line number 29, in Claim 6, after the word "more" the word --aqueous-- should be inserted.

Signed and Sealed this twenty-second Day of July 1975

[SEAL]

Attest:

RUTH C. MASON
Attesting Officer

C. MARSHALL DANN
Commissioner of Patents and Trademarks